United States Patent
Freisleben et al.

(10) Patent No.: US 10,626,896 B2
(45) Date of Patent: Apr. 21, 2020

(54) CONTROL SYSTEM FOR FLUSHING CONTAMINATED HYDRAULIC FLUID

(71) Applicant: CNH Industrial America LLC, New Holland, PA (US)

(72) Inventors: Michael W. Freisleben, Homer Glen, IL (US); Jerry L. Brinkley, Woodridge, IL (US); Joshua M. Guarino, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 69 days.

(21) Appl. No.: 16/100,847

(22) Filed: Aug. 10, 2018

(65) Prior Publication Data
US 2020/0049172 A1 Feb. 13, 2020

(51) Int. Cl.
  *F15B 21/041* (2019.01)
  *F15B 21/00* (2006.01)
  *E02F 9/22* (2006.01)

(52) U.S. Cl.
  CPC .......... *F15B 21/005* (2013.01); *E02F 9/2267* (2013.01); *F15B 21/041* (2013.01); *F15B 2211/41554* (2013.01); *F15B 2211/46* (2013.01); *F15B 2211/615* (2013.01)

(58) Field of Classification Search
  CPC . F15B 2211/615; F15B 21/005; F15B 21/041
  See application file for complete search history.

(56) References Cited

U.S. PATENT DOCUMENTS

| | | |
|---|---|---|
| 4,030,295 A | 6/1977 | Khatti et al. |
| 4,354,688 A | 10/1982 | Swanson |
| 5,577,435 A | 11/1996 | Kowalyk et al. |
| 6,170,412 B1 | 1/2001 | Memory et al. |
| 6,182,588 B1 | 2/2001 | Bodie et al. |
| 6,467,264 B1 | 10/2002 | Stephenson et al. |
| 6,474,064 B1 | 11/2002 | Heyne et al. |

(Continued)

FOREIGN PATENT DOCUMENTS

WO  2017/031066 A1  2/2017

OTHER PUBLICATIONS

Borghi et al.; Energy Savings in the Hydraulic Circuit of Agricultural Tractors; 68th Conference of the Italian Thermal Machines Engineering Association, AT2013; Energy Porcedia 45 (2014) 352-361; https://www.sciencedirect.com/science/article/pii/S1876610214000393—(10) pages.

*Primary Examiner* — Michael Leslie
*Assistant Examiner* — Daniel S Collins
(74) *Attorney, Agent, or Firm* — Rebecca L. Henkel; Rickard K. DeMille

(57) ABSTRACT

The present inventors have recognized that contaminants in hydraulic fluid in a hydraulic system of an off-highway implement can be efficiently filtered by a filtration system of the source of hydraulic power by conducting an operation which controls existing valves for precisely operating cylinders of the system to return the fluid to the source of hydraulic power through a connector with little or no fluid going through cylinders. Such an operation can be advantageously executed immediately following connection of the source of hydraulic power to the manifold of the implement.

12 Claims, 6 Drawing Sheets

(56) References Cited

U.S. PATENT DOCUMENTS

| | | | |
|---|---|---|---|
| 6,698,523 B2* | 3/2004 | Barber | A01B 63/22 |
| | | | 172/239 |
| 6,918,248 B2 | 7/2005 | Reiners et al. | |
| 6,997,098 B2 | 2/2006 | Beaujot | |
| 7,210,292 B2 | 5/2007 | Price et al. | |
| 8,726,645 B2 | 5/2014 | Shang et al. | |
| 9,429,231 B2 | 8/2016 | Uenishi | |
| 9,615,499 B2* | 4/2017 | Kowalchuk | A01C 7/203 |
| 2015/0053442 A1 | 2/2015 | Kovach et al. | |
| 2018/0156244 A1 | 6/2018 | Ma et al. | |
| 2018/0332761 A1* | 11/2018 | Raetzman | F04B 39/16 |

* cited by examiner

CONTROL SYSTEM FOR FLUSHING CONTAMINATED HYDRAULIC FLUID

FIELD OF THE INVENTION

The present invention relates generally to off-highway implements having hydraulic systems, and more particularly, to implements having electronically controlled valves for controlling hydraulic fluid with respect to a hydraulic actuator in which the valves are controlled in an operation to enable filtering of the fluid by simultaneously activating the valves to return the fluid to a connector via a return line.

BACKGROUND OF THE INVENTION

There are a wide variety of off-highway implements which utilize hydraulic power. One example is a tillage implement for preparing soil for planting in which hydraulic power is used to raise and lower tillage shanks. Such implements often receive hydraulic power through hoses with "quick connect couplings" which may be arranged at a central manifold. To conduct off-highway operations, the manifold can be connected to an external hydraulic power source for operating the implement, such as a tractor pulling the implement. However, over time, contaminants in the hydraulic fluid which may enter through the "quick connect couplings" can cause damage to various seals, valves, cylinders and other components. This can potentially lead to pressure intensification, leaks and/or ultimately loss of hydraulic power. A need therefore exists to efficiently enable filtering of such contaminants to minimize one or more of the aforementioned drawbacks.

SUMMARY OF THE INVENTION

The present inventors have recognized that contaminants in hydraulic fluid in a hydraulic system of an off-highway implement can be efficiently filtered by a filtration system of the source of hydraulic power by conducting an operation which controls existing valves for precisely operating hydraulic components of the system such as but not limited to cylinders and motors to return the fluid to the source of hydraulic power through a connector with little or no fluid flowing through components. Such an operation can be advantageously executed immediately following connection of the source of hydraulic power to the manifold of the implement.

One aspect can provide an addition of control software to operate hydraulic valves that are already a part of the hydraulic system of the implement to flush contaminated oil from fluid lines connecting the tractor to the implement back to a tractor filtration system. This essentially provides short circuit independent metering. Accordingly, this system can flush contaminated oil from high pressure hydraulic fluid lines that connect the tractor to the implement. This is accomplished by operating an independent metering valve within the implement hydraulic circuit in such a way as to short circuit the oil from the hydraulic actuators sending it back to the tractor filtration system. The software control system engages the tractor operator to perform certain functions to facilitate the flushing of the critical circuits.

Specifically then, one aspect of the present invention can provide an off-highway implement, including: a frame supported by wheels; a set of ground engaging tools supported by the frame, the set of ground engaging tools including a hydraulic cylinder arranged with respect to the frame for raising and lowering the set of ground engaging tools, the hydraulic cylinder including a base, a base port, a rod and a rod port, in which the rod is configured to extend from the base when hydraulic fluid is supplied to the base port and returned from the rod port, and in which the rod is configured to retract toward the base when hydraulic fluid is supplied to the rod port and returned from the base port; a connector configured to supply hydraulic fluid in a supply line and return hydraulic fluid in a return line when connected to a hydraulic power source; first and second electronically controlled valves, in which the first valve is configured to supply hydraulic fluid from the supply line to the hydraulic cylinder when activated, and in which the second valve is configured to return hydraulic fluid from the hydraulic cylinder to the return line when activated; and a controller in communication with the first and second valves, the controller executing a program stored in a non-transient medium to: execute an operation to enable filtering of the hydraulic fluid supplied through the connector by simultaneously activating the first and second valves to return the hydraulic fluid in the supply line to the connector via the return line.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
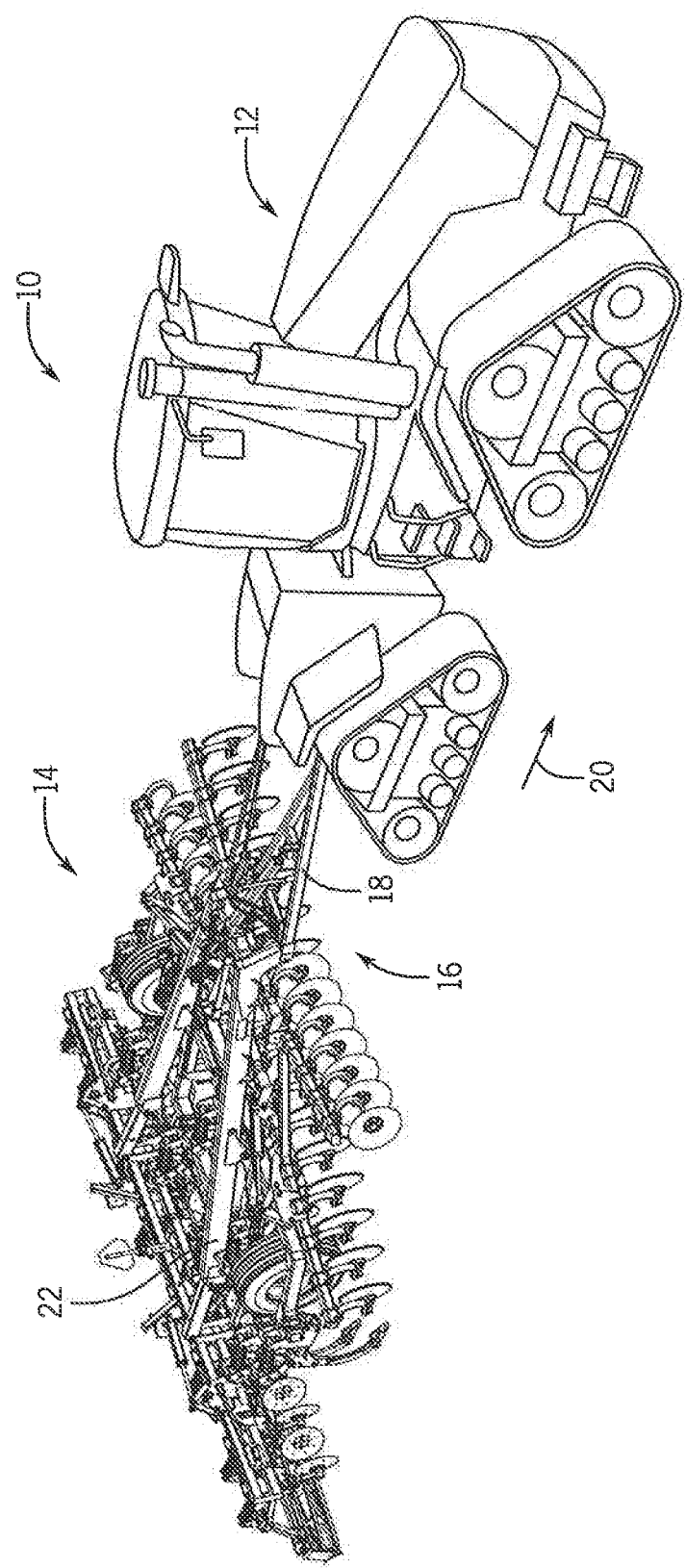
FIG. 1 is perspective view of an exemplar off-highway system including an implement being pulled by a tractor which can include a hydraulic system for flushing contaminated hydraulic fluid in accordance with an aspect of the invention.
Figure 2:
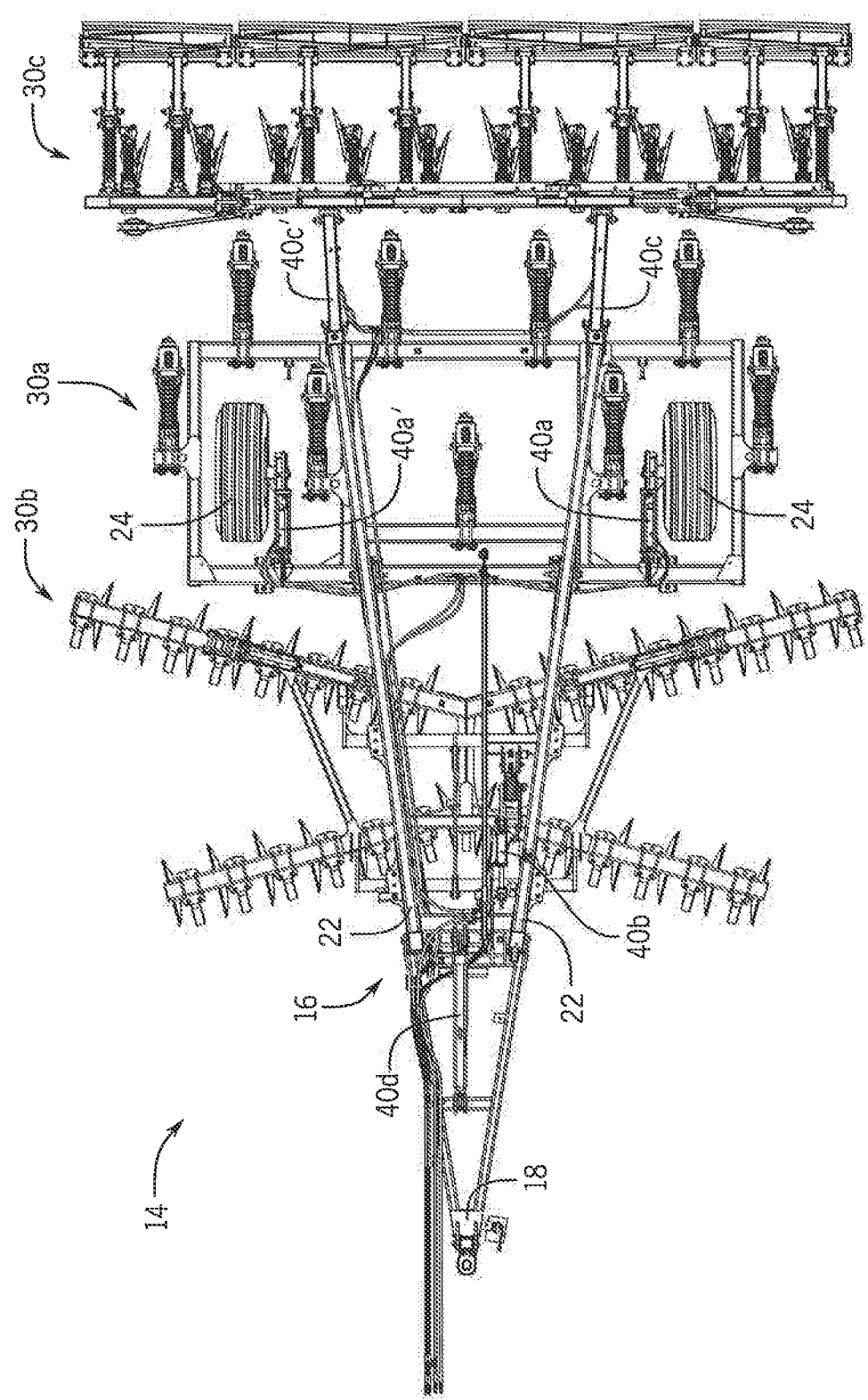
FIG. 2 is a top view of the implement of FIG. 1, illustrating various hydraulic cylinders for raising and lowering ground engaging tools of the implement.
Figure 3:
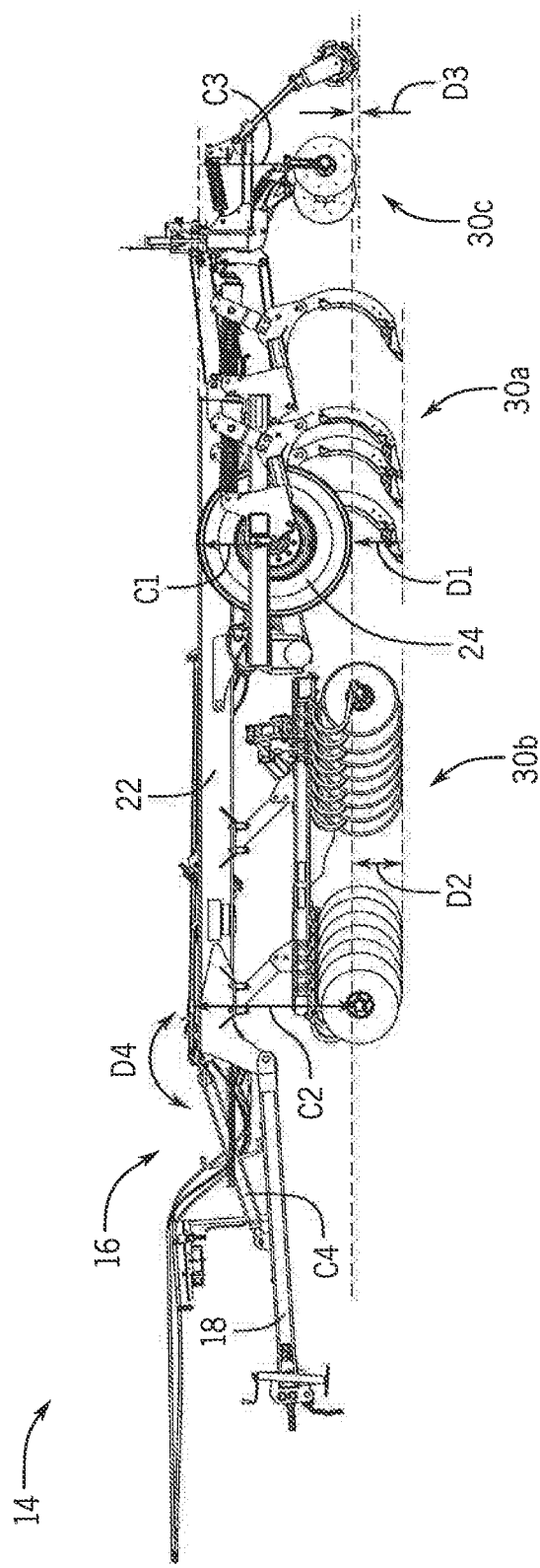
FIG. 3 is a side view of the implement of FIG. 2, illustrating the various hydraulic cylinders controlling depths of the ground engaging tools.

Referring now to the drawings, and more particularly to FIG. 1, there is shown by way of example an off-highway system 10 which generally includes a tractor 12 and an off-highway implement 14 for tilling and finishing soil prior to seeding. With additional reference to FIGS. 2 and 3 showing top and sides views, respectively, the implement 14 can be configured as a multi-section (combination tool) field disk ripper, such as the Ecolo-Tiger 875 disk ripper, as available from CNH Industrial. The implement 14 can include a carriage frame 16 which can be directly towed by a traction unit, such as the tractor 12. The frame 16 can include a pull hitch 18 generally extending in a travel direction 20, and forward and aft directed carrier frame members 22 which are coupled with and extend from pull hitch 18. Reinforcing gusset plates may be used to strengthen the connection between pull hitch 18 and carrier frame members 22.

The frame 16 can be supported by multiple wheels 24. The wheels 24 can be pivoted between a field operation position and a transport position by hydraulic cylinders associated with the wheels. The frame 16, in turn, can support multiple ground engaging tools 30 useful for field operations, including first, second and third sets of ground engaging tools 30a, 30b and 30c, respectively. In one aspect, the first set of ground engaging tools 30a could comprise tillage shanks for ripping compacted soil; the second set of ground engaging tools 30b could comprise disc blades for cutting off-highway residue, such as corn stalks, arranged forward of the tillage shanks; and the third set of ground engaging tools 30c could comprise leveling discs for distributing soil, and/or baskets (or "crumblers") for breaking large soil clods, arranged rearward of the tillage shanks.

Each set of ground engaging tools includes one or more hydraulic cylinders 40 arranged with respect to the frame 16. The hydraulic cylinders 40 are configured to raise and lower each respective set of ground engaging tool 30 with respect to the frame 16. Accordingly, each set of ground engaging tools 30 can be configured to engage the ground at a ground engaging depth ("D"), when lowered by respective hydraulic cylinders 40, to be in contact with the ground. For example, the first set of ground engaging tools 30a can include cylinders 40a and 40a' (identified as "C1 LH" and "C1 RH" on left and right sides, respectively, and as "C1" collectively) for raising and lowering the tillage shanks for engaging the ground at a tillage ground engaging depth "D1;" the second set of ground engaging tools 30b can include a cylinder 40b (identified as "C2") for raising and lowering the disc blades for engaging the ground at a disc blade ground engaging depth "D2;" and the third set of ground engaging tools 30c can include cylinders 40c and 40c' (identified as "C3 LH" and "C3 RH" on left and right sides, respectively, and as "C3" collectively, mechanically linked through a rockshaft, but hydraulically plumbed in parallel) for raising and lowering the leveling discs and/or baskets for engaging the ground at a leveling ground engaging depth "D3." In addition, a hydraulic cylinder 40d (identified as "C4") can be arranged with respect to the frame 16 for changing an angle of the frame 16 (identified as "D4") with respect to the ground, preferably for leveling the frame 16 with respect to the hitch 18 and the tractor 12.

In operation, retracting C1 lowers the frame 16 (and the first set 30a), whereas extending C1 raises the frame 16; extending C2 raises the disc blades (the second set 30b), whereas retracting C2 lowers the disc blades; extending C3 raises the leveling discs and/or baskets (the third set 30c), whereas retracting C3 lowers the leveling discs and/or baskets; and extending C4 pitches the implement 14 forward (angle of the frame 16), whereas retracting C4 pitches the implement 14 rearward.

Figure 4:
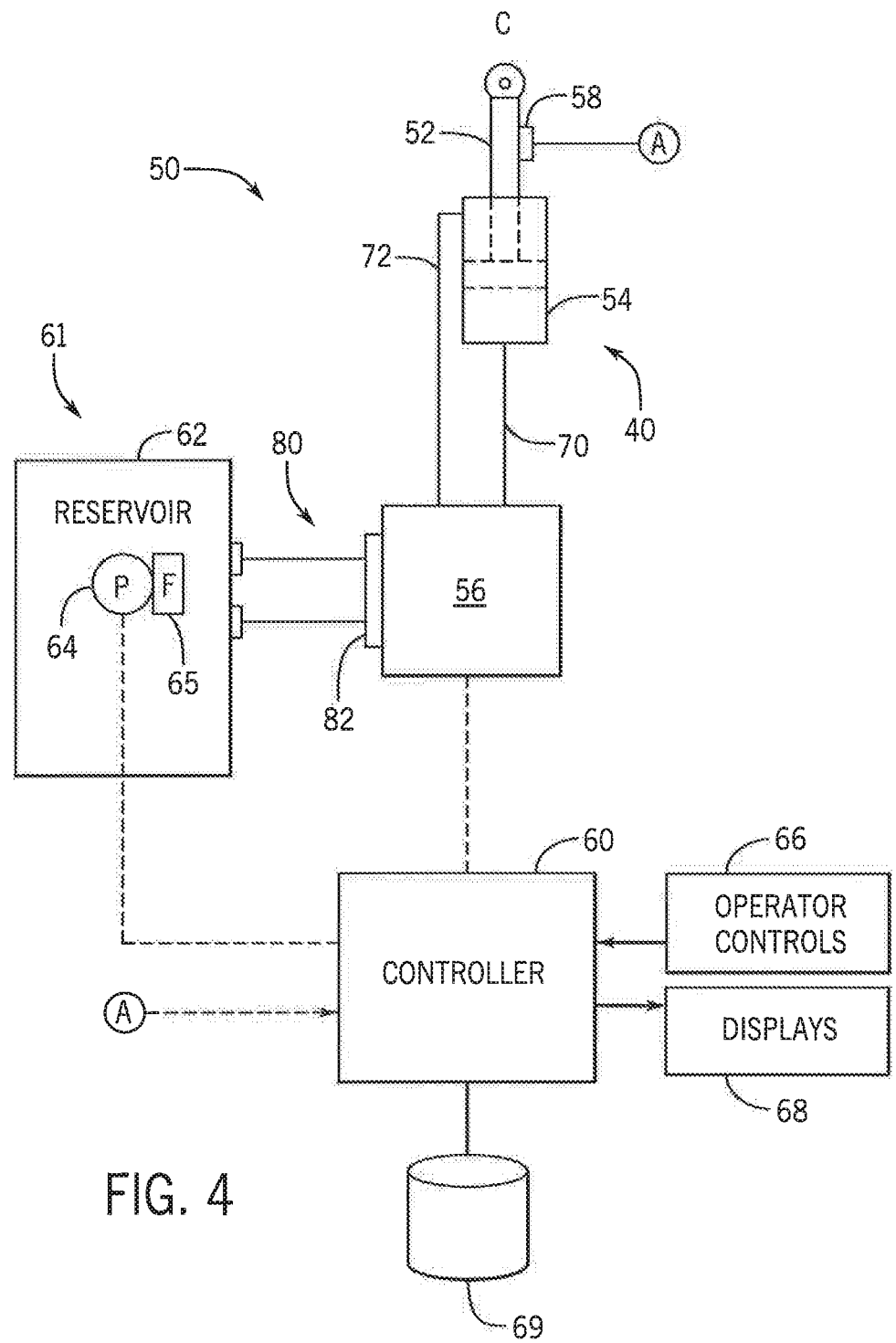
FIG. 4 is a diagram illustrating control of the hydraulic system of the off-highway system of FIG. 1.

With additional reference to FIG. 4, a schematic diagram for a system 50 for control of the hydraulic system of the off-highway system 10 is provided in accordance with aspect of the invention. Various portions of the system 50 can be on the implement 14 whereas other portions of the system 50 can be on the tractor 12. The system 50, under the control of the controller 60, can control the cylinders 40 ("C") of the implement 14 to achieve various functions, such as setting each set of ground engaging tools 30 to a given depth, adjusting wheels 24 between field operation and transport positions, and the like. The controller can be located on the implement 14 or the tractor 12 through a CAN bus. Each cylinder 40 includes a movable "piston" or rod 52 that is extendable and retractable from a "cap" or base 54 of the cylinder 40, as fluidly controlled by an electronically controlled valve system 56 (controlled by the controller 60). Each cylinder 40 can be a double acting, single ended hydraulic cylinder with an integrated linear position sensor 58. The controller 60 can selectively energize one or more electronically controlled valves, via solenoids, of the valve system 56 operably connected to the cylinder 40. Valves of the valve system 56 can exchange hydraulic fluid with respect to cylinders 40 for precise control of cylinder lengths. The valve system 56 is fluidly connected to a hydraulic power source 61, which can include a fluid reservoir 62, a pump 64 and a filtration system 65. The hydraulic power source 61 is typically located on the tractor 12, with multiple hoses 80 connected to quick-connect connectors of a manifold 82 located on the implement 14. The pump 64 can be configured to supply hydraulic fluid from the fluid reservoir 62 to the implement 14. The pump 64 could supply hydraulic fluid at a pressure, for example, 3000 psi (pounds per square inch). The filtration system 65 can be configured to filter contaminants from the hydraulic fluid in the circuit. Under control of the valve system 56 and the controller 60, to extend the rod 52 of any particular cylinder 40, hydraulic fluid can be supplied to the cylinder 40 through a base port 70, while hydraulic fluid is also withdrawn from the cylinder 40 through a rod port 72. Also, to retract the rod 52 of any particular cylinder 40, hydraulic fluid can be supplied to the cylinder 40 through the rod port 72, while hydraulic fluid is also withdrawn from the cylinder 40 through the base port 70, as controlled by the valve system 56 and the controller 60. Accordingly, the controller 60 can selectively energize solenoids of the valve system 56 to vary the cylinder length of any of the cylinders 40 as desired. Operator controls 66, which could be within an operator cab of the tractor 12, can receive inputs from an operator for configuring various heights, such as ground engaging depths D1, D2, D3 and/or D4 (angle), for calculating the various cylinder lengths to achieve such heights, and/or for configuring filtering operations of hydraulic fluid as described herein. Various displays 68, which could also be within the operator cab, can provide feedback to the operator.

Figure 5:
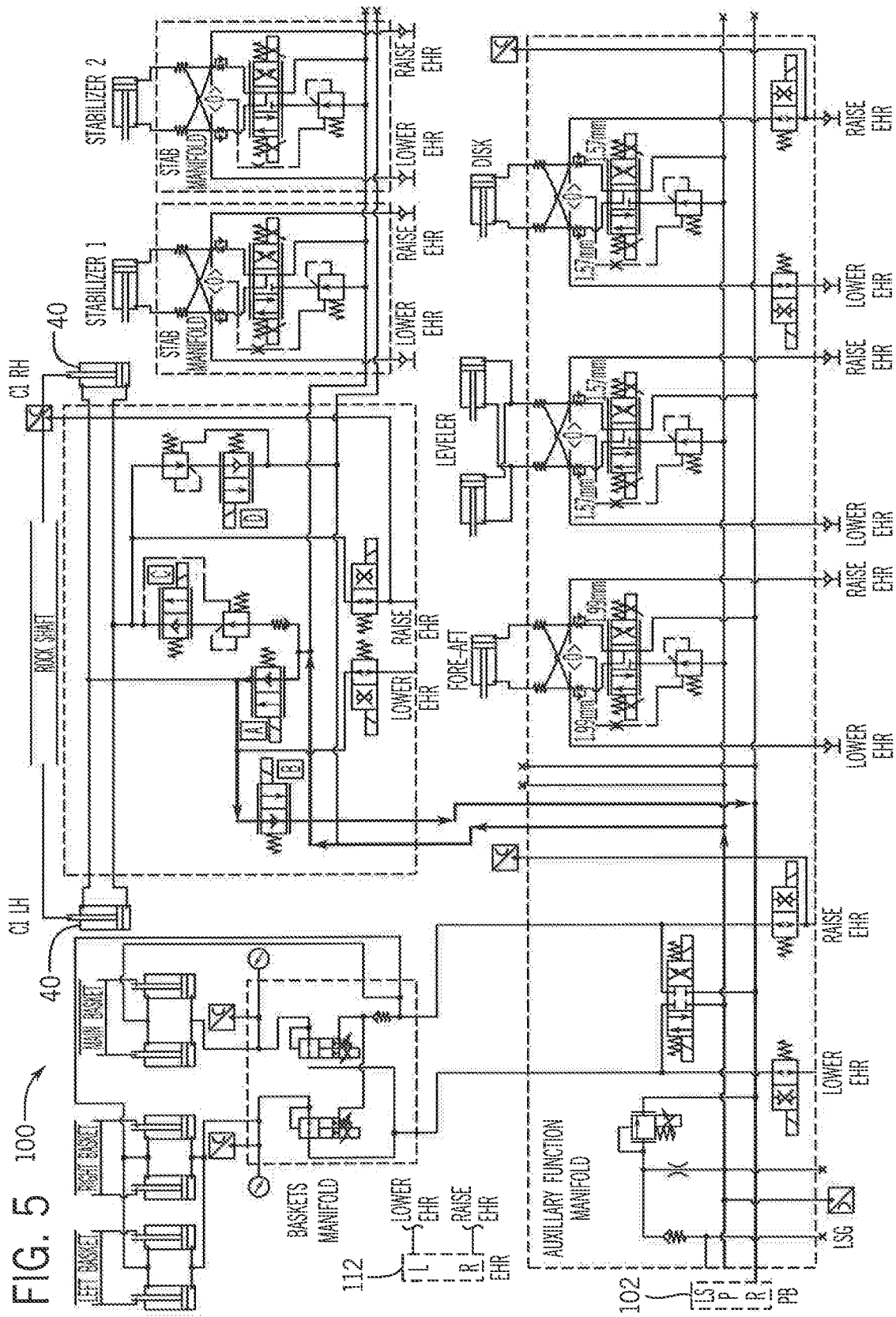
FIG. 5 is a schematic diagram illustrating control of valves of the hydraulic system of FIG. 1 to enable filtering of hydraulic fluid in a first operation.

Referring now to FIG. 5, where like numerals refer to like parts throughout, a schematic diagram illustrating control of the valve system 56 in the hydraulic system to enable filtering of hydraulic fluid in a first operation 100 is provided in accordance with an aspect of the invention. A connector 102 is configured to supply hydraulic fluid in a supply line (identified as "P") and return hydraulic fluid in a return line (identified as "R"). The connector 102 can be part of the manifold 82 and may typically include a "quick-connect" style connectors for connecting hoses 80 from the hydraulic power source 61. The valve system 56 can include a valve "A" configured to supply hydraulic fluid from the supply line P to a port of one or more of the aforementioned hydraulic cylinders 40 when activated, such as the rod ports of C1 RH and C1 LH by way of example; and a valve "B" configured to return hydraulic fluid from the port of the one or more hydraulic cylinders 40 to the return line R when activated, such as the same rod ports of C1 RH and C1 LH. The valves A and B can be single direction, proportional control valves configured to meter hydraulic fluid for fine adjustment of the cylinder 40. The controller 60 can execute a program stored in non-transient medium 69 to execute the first operation 100 to enable filtering of the hydraulic fluid supplied through the connector 102 by simultaneously activating the valves A and B to return the hydraulic fluid in the supply line to the connector via the return line. This can allow driving the fluid through the filtration system 65 for filtering, with little or no fluid going through cylinders 40. Moreover, valves A and B can be simultaneously activated while maintaining a constant length of the cylinder 40.

Figure 6:
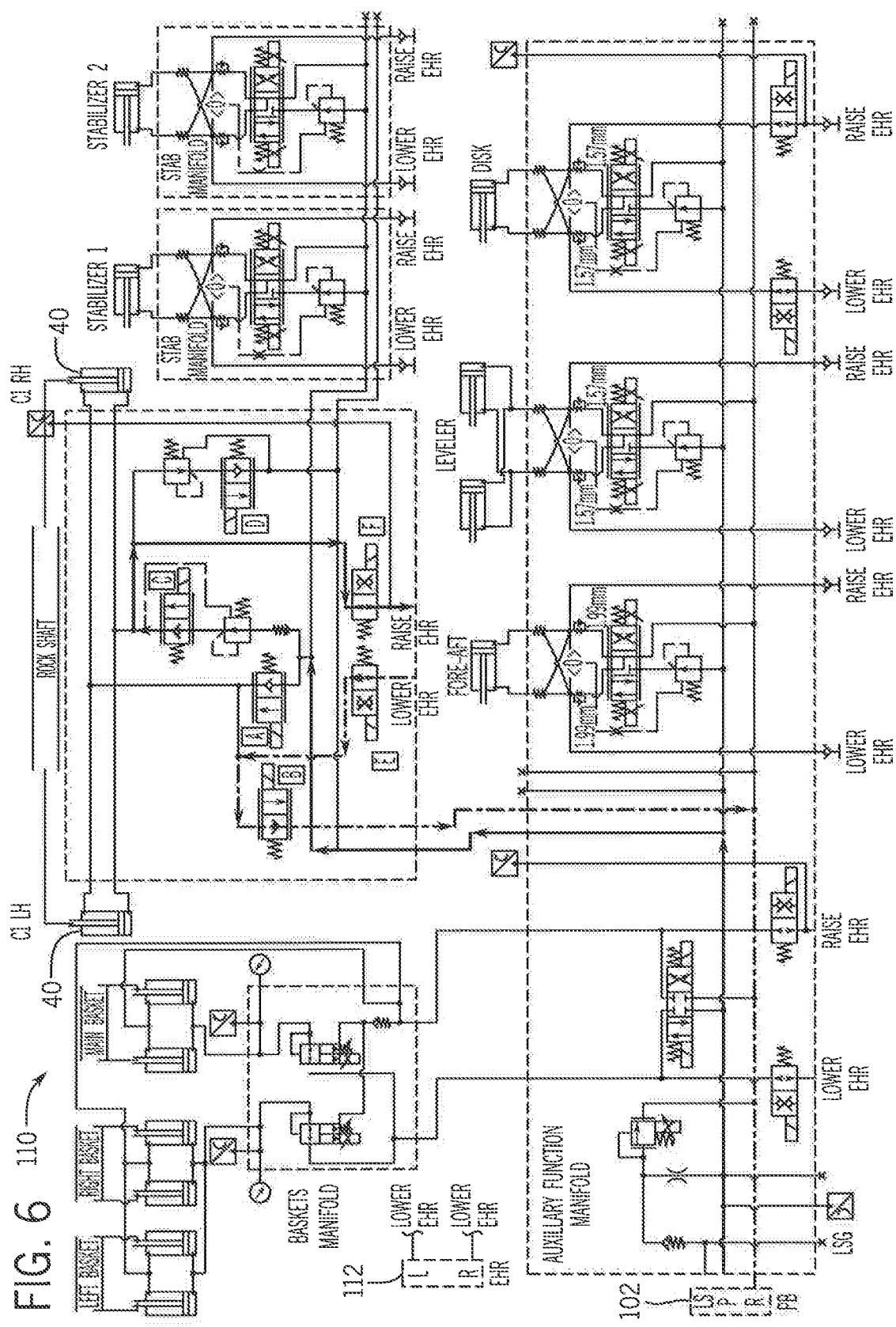
FIG. 6 is a schematic diagram illustrating control of valves of the hydraulic system of FIG. 1 to enable filtering of hydraulic fluid in a second operation.

Referring now to FIG. 6, in an another aspect where like numerals refer to like parts throughout, a schematic diagram illustrating control of the valve system 56 in the hydraulic system to enable filtering of hydraulic fluid in a second operation 110 is provided in accordance with an aspect of the invention. While valves A and B are present to supply and return fluid with respect to the rod port of the cylinder 40, respectively, valves C and D can be present to supply and return fluid with respect to the base port of the same cylinder 40, respectively. Valves C and D can also be single direction, proportional control valves configured to meter hydraulic fluid for fine adjustment of the cylinder 40. In addition, the manifold 82 can include a second connector 112 that may also include "quick-connect" style connectors for connecting additional hoses 80 from the hydraulic power source 61. The valve system 56 can include a valve "E" configured to supply and return hydraulic fluid with respect to the rod port of the cylinder 40 and a first transport line of the second connector 112 ("Lower EHR," or Lower Electrohydraulic Remote) when activated, such as the rod ports of C1 RH and C1 LH; and a valve "F" configured to supply and return hydraulic fluid with respect to the base port of the one or more hydraulic cylinder 40 and a second transport line of the second connector 112 ("Raise EHR," or Raise Electrohydraulic Remote) when activated. The valves E and F can be bi-directional, on-off valves without proportional control for course adjustment of a hydraulic cylinder or to isolate valves A, B, C, & D from Lower and Raise EHR. The controller 60 can execute a program stored in non-transient medium 69 to execute the second operation 110 to enable filtering of the hydraulic fluid supplied through the connector 112 by simultaneously activating valves B, C, E and F while deactivating valve A and D. This can allow filtration of fluid provided by connectors 102 and 112.

As a result, contaminants in the fluid can be efficiently filtered by the filtration system 65 by conducting one or more of the aforementioned operations blocking fluid from going through precisely controlled cylinders 40 by using one or more existing valves A, B, C, D, E and/or F to return the fluid to the hydraulic power source 61 connectors 102 and/or 112 with little or no fluid going through cylinders 40. Moreover, such aforementioned operations can be advantageously executed immediately following connection of the hydraulic power source 61 to the manifold 82.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An off-highway implement, comprising:
a frame supported by a plurality of wheels;
a set of ground engaging tools supported by the frame, the set of ground engaging tools including a hydraulic cylinder arranged with respect to the frame for raising and lowering the set of ground engaging tools, the hydraulic cylinder comprising a base, a base port, a rod and a rod port, wherein the rod is configured to extend from the base when hydraulic fluid is supplied to the base port and returned from the rod port, and wherein the rod is configured to retract toward the base when hydraulic fluid is supplied to the rod port and returned from the base port;
a connector configured to supply hydraulic fluid in a supply line and return hydraulic fluid in a return line when connected to a hydraulic power source;
first and second electronically controlled valves, wherein the first valve is configured to supply hydraulic fluid from the supply line to the hydraulic cylinder when activated, and wherein the second valve is configured to return hydraulic fluid from the hydraulic cylinder to the return line when activated; and
a controller in communication with the first and second valves, the controller executing a program stored in a non-transient medium to:
execute an operation to enable filtering of the hydraulic fluid supplied through the connector by simultaneously activating the first and second valves to return the hydraulic fluid in the supply line through the connector via the return line.

2. The system of claim 1, wherein the first and second valves are simultaneously activated while maintaining a constant length of the hydraulic cylinder.

3. The system of claim 1, wherein the first and second valves are configured to supply and return hydraulic fluid, respectively, with respect to the rod port of the hydraulic cylinder when activated.

4. The system of claim 3, further comprising third and fourth electronically controlled valves, wherein the third and fourth valves are configured to supply and return hydraulic fluid, respectively, with respect to the base port of the hydraulic cylinder.

5. The system of claim 4, wherein the hydraulic cylinder is a first hydraulic cylinder, wherein the set of ground engaging tools further includes a second hydraulic cylinder arranged with respect to the frame for raising and lowering the set of ground engaging tools, wherein the first and second valves are configured to supply and return hydraulic fluid, respectively, with respect to the rod ports of the first and second hydraulic cylinders, and wherein the third and fourth valves are configured to supply and return hydraulic fluid, respectively, with respect to the base ports of the first and second hydraulic cylinders.

6. The system of claim 4, wherein the first, second, third and fourth valves are single direction, proportional control valves configured to meter hydraulic fluid for fine adjustment of the hydraulic cylinder.

7. The system of claim 6, further comprising fifth and sixth electronically controlled valves, wherein the fifth and sixth valves are bi-directional, on-off valves without proportional control for coarse adjustment of the hydraulic cylinder, or isolation of the fine adjustment valves, wherein the fifth valve is configured to supply and return hydraulic fluid with respect to the rod port of the hydraulic cylinder, and wherein the sixth valve is configured to supply and return hydraulic fluid with respect to the base port of the hydraulic cylinder.

8. The system of claim 7, wherein the operation is a first operation, and further comprising the controller executing a second operation to enable filtering of the hydraulic fluid supplied by the connector by simultaneously activating: either the first and second valves with the fifth and sixth valves; or the third and fourth valves with the fifth and sixth valves, to return the hydraulic fluid in the supply line to the connector via the return line.

9. The system of claim 8, wherein the second operation comprises simultaneously activating the second, third, fifth and sixth valves while the first and fourth valves are deactivated.

10. The system of claim 1, further comprising a hydraulic power source attached to the connector, the hydraulic power source comprising a hydraulic fluid reservoir, a pump and a filter, wherein the operation enables filtering of the hydraulic fluid by driving the hydraulic fluid through the filter.

11. The system of claim 1, wherein the connector enables connection and disconnection of a plurality of hydraulic hoses in a manifold.

12. The system of claim 1, wherein the execution of the filtration operation is commanded either manually by an operator or automatically without an operator.

* * * * *